US012723537B2

(12) United States Patent
Yu et al.

(10) Patent No.: US 12,723,537 B2
(45) Date of Patent: Sep. 1, 2026

(54) PASSIVE PRECHAMBER FUELING DEVICE AND METHOD

(71) Applicant: SAUDI ARABIAN OIL COMPANY, Dhahran (SA)

(72) Inventors: Xin Yu, Novi, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 32 days.

(21) Appl. No.: 19/033,184

(22) Filed: Jan. 21, 2025

(65) Prior Publication Data

US 2026/0210285 A1 Jul. 23, 2026

(51) Int. Cl.
*F02B 19/10* (2006.01)
*F02B 19/12* (2006.01)

(52) U.S. Cl.
CPC .......... *F02B 19/1085* (2013.01); *F02B 19/12* (2013.01)

(58) Field of Classification Search
CPC ...... F02B 19/00; F02B 19/1085; F02B 19/12; F02B 19/10; F02B 2720/276; F02B 2720/278
See application file for complete search history.

(56) References Cited

U.S. PATENT DOCUMENTS 1,722,145 A 7/1929 Hermann
4,011,841 A 3/1977 Sato et al.
(Continued)

FOREIGN PATENT DOCUMENTS

CN 101929411 B 8/2016
DE 102018000285 A1 7/2019
(Continued)

OTHER PUBLICATIONS

Bialli, S. et al., "Numerical Investigation on the Performance of a 4-Stroke Engine with Different Passive Pre-Chamber Geometries Using a Detailed Chemistry Solver," Energies, MDPI, No. 15, No. 4968, pp. 1-18, Jul. 7, 2022 (18 pages).
(Continued)

*Primary Examiner* — Grant Moubry
(74) *Attorney, Agent, or Firm* — Osha Bergman Watanabe & Burton LLP

(57) ABSTRACT

An engine includes pistons, cylinders, combustion chambers, and intake lines. The engine also includes at least one port fuel injector, a flow guide plate, spark plugs, prechambers housing the spark plugs, and exhaust lines. The pistons are actuated by combustion reactions. The cylinders house the pistons. The combustion chambers form containment boundaries for the combustion reactions. The intake lines form an intake manifold and provide an air fuel mixture to the combustion chambers. The flow guide plate directs the air-fuel mixture to a specified location with the corresponding combustion chamber. The spark plugs ignite the air-fuel mixture to initiate the combustion reactions. Each prechamber houses a corresponding spark plug and concentrates the air-fuel mixture in close proximity to the corresponding spark plug. The exhaust lines form an exhaust manifold that provides a path for exhaust gas formed by the combustion reaction to exit the combustion chambers.

20 Claims, 7 Drawing Sheets

(56) References Cited

U.S. PATENT DOCUMENTS

| | | | | |
|---|---|---|---|---|
| 4,250,852 | A * | 2/1981 | Abulkasim ogly Kerimov .......... | F02B 19/108 123/260 |
| 6,318,336 | B1 | 11/2001 | Mueller | |
| 7,216,623 | B2 | 5/2007 | Teraji et al. | |
| 9,856,835 | B1 | 1/2018 | Coldren et al. | |
| 10,400,696 | B2 | 9/2019 | Blaxill et al. | |
| 10,458,311 | B2 | 10/2019 | Blaxill et al. | |
| 10,612,454 | B2 | 4/2020 | Bedogni et al. | |
| 11,002,231 | B2 * | 5/2021 | Ibaragi ............. | F02M 35/10019 |
| 11,060,443 | B1 | 7/2021 | Thomas et al. | |
| 11,725,571 | B1 | 8/2023 | Gastaldi | |
| 11,959,435 | B1 | 4/2024 | Yu et al. | |
| 2018/0363539 | A1 | 12/2018 | Shelby et al. | |
| 2020/0200068 | A1 * | 6/2020 | Schock ............... | F02D 41/0007 |
| 2022/0120209 | A1 | 4/2022 | Zhang | |
| 2022/0220921 | A1 | 7/2022 | Engineer | |
| 2024/0141823 | A1 | 5/2024 | Yu et al. | |

FOREIGN PATENT DOCUMENTS

| | | | |
|---|---|---|---|
| DE | 102020117008 | A1 | 12/2021 |
| GB | 1242594 | A | 8/1971 |
| JP | H10141113 | A | 5/1998 |
| JP | 7502102 | B2 | 1/2022 |
| WO | 2006018291 | A1 | 2/2006 |

OTHER PUBLICATIONS

Sementa, P. et al., “Custom-Designed Pre-Chamber: Investigating the Effects on Small SI Engine in Active and Passive Modes,” Energies, MDPI, vol. 16, No. 5097, pp. 1-24, Jul. 1, 2023 (24 pages).

International Search Report and Written Opinion issued in Application No. PCT/US2026/011366, mailed on Jun. 16, 2026 (21 pages).

* cited by examiner

PASSIVE PRECHAMBER FUELING DEVICE AND METHOD

BACKGROUND

New environmental regulations require specific thresholds to be met for pollutants such as carbon monoxide, unburnt hydrocarbons, nitrogen oxides, and particulate matter. Prechamber technologies provide an opportunity to improve engine fuel efficiency. A passive prechamber typically includes a specifically designed volume with cylinder-like passages downstream of an ignition source. A passive prechamber can also offer cost saving benefits, as a passive prechamber improves various combustion parameters without requiring additional battery power. Accordingly, there exists a need for a commercially viable option that achieves high levels of fuel efficiency improvement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engine containing pistons configured to be actuated by combustion reactions within the engine. The engine also includes cylinders that house the pistons and combustion chambers that form containment boundaries for the combustion reactions. A plurality of intake lines collectively form an intake manifold that fluidly connects to each combustion chamber to provide an air-fuel mixture to the combustion chamber. At least one port fuel injector injects fuel into the intake lines to form the air-fuel mixture, which is directed via a flow guide plate to a specified location within the combustion chamber. Spark plugs ignite the air-fuel mixture in the prechamber to initiate the combustion reactions. Prechambers house spark plugs and concentrate the air-fuel mixture close to the spark plug for ignition. Exhaust lines forming an exhaust manifold are in fluid communication with the combustion chambers to provide a pathway for exhaust gases formed by the combustion reactions to exit the combustion chambers.

In another aspect, embodiments disclosed herein relate to an engine containing pistons actuated by combustion reactions within the engine. The engine further includes cylinders that house the pistons and combustion chambers that form a containment boundary for the combustion reactions. A plurality of intake lines collectively form an intake manifold that fluidly connects to each combustion chamber to provide an air-fuel mixture to the combustion chamber. At least one port fuel injector injects fuel into the intake lines to form the air-fuel mixture. First spark plugs may or may not ignite the air-fuel mixture in the combustion chambers to initiate the combustion reactions. Second spark plugs ignite the air-fuel mixture in the prechamber within the combustion chambers to initiate the combustion reactions. Prechambers house the second spark plugs and concentrate the air-fuel mixture close to the second spark plug for ignition. Exhaust lines forming an exhaust manifold are in fluid communication with the combustion chambers to provide a pathway for exhaust gases formed by the combustion reactions to exit the combustion chambers.

In an additional aspect, embodiments disclosed herein relate to a method including housing pistons in cylinders and housing combustion chambers in cylinders. The method further includes supplying air to intake lines forming an intake manifold, where each intake line is fluidly connected with a combustion chamber. Fuel is injected into the intake lines with a port fuel injector to mix fuel with air to form an air-fuel mixture. The air-fuel mixture is directed into prechambers housing second spark plugs. The air-fuel mixture is combusted using first spark plugs within the combustion chamber if used. The air-fuel mixture is also combusted with the second spark plugs within the prechamber within the combustion chamber, producing an exhaust gas. The exhaust gas is released through exhaust lines forming an exhaust manifold in fluid communication with the combustion chambers.

Any combinations of the various embodiments and implementations disclosed herein can be used in a further embodiment, consistent with the disclosure. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element of the invention. In this respect, the term "upper" denotes an element disposed above a corresponding "lower" element in a vertical direction, while the term "lower" conversely describes an element disposed below a corresponding "upper" element in the vertical direction. Similarly, the term "inner" refers to an orientation closer to a center of an object than a corresponding "outer" orientation.

In one aspect, embodiments disclosed herein relate to an engine with cylinders where each cylinder includes a passive prechamber device with a single spark plug. The passive prechamber houses a spark plug and is positioned on an upper end of a combustion chamber. A flow guide plate is positioned to divide an intake line leading to the combustion chamber into two or multiple regions. A port fuel injector is positioned either above, below, or to the side of the sections of the flow guide plate to inject fuel into the intake line.

In another aspect, embodiments disclosed herein relate to an engine with cylinders where each cylinder has one passive prechamber device with a spark plug and a second spark plug disposed outside of the passive prechamber device. A first spark plug is mounted on an upper end of the combustion chamber. The passive prechamber houses the second spark plug and is positioned on a side of the combustion chamber. A port fuel injector is positioned to inject fuel into the intake line.

Figure 1A:
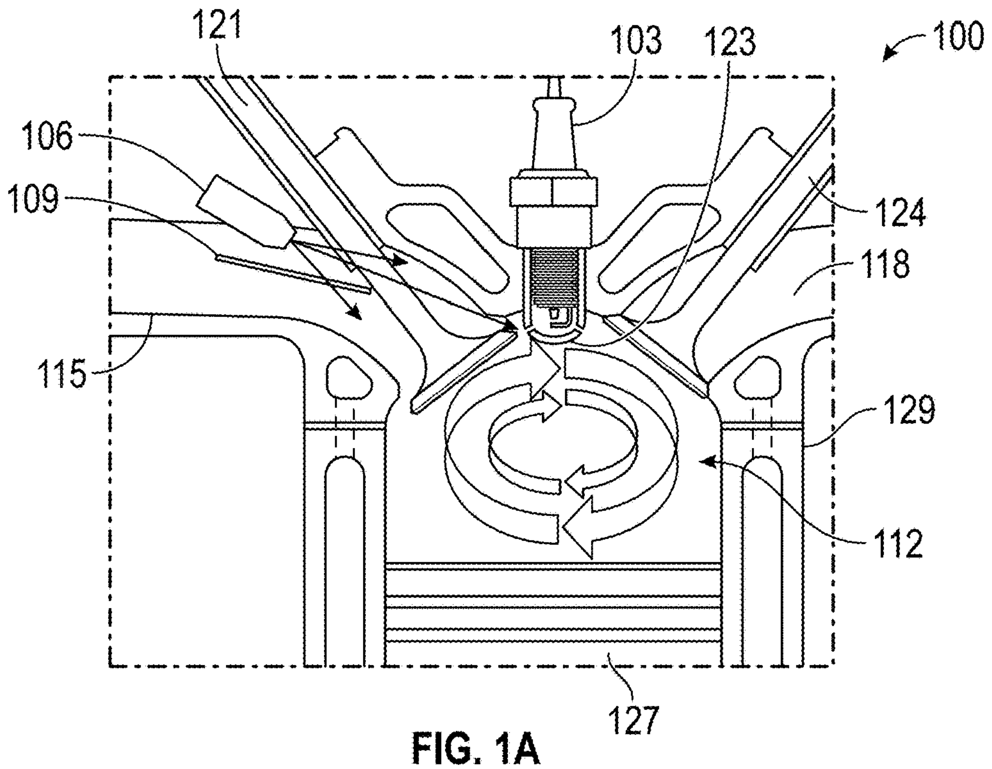
FIG. 1A depicts an internal combustion engine in accordance with one or more embodiments of the present disclosure.

Turning to FIG. 1A, an internal combustion engine 100 is depicted in accordance to one or more embodiments of the present disclosure. In general, the engine 100 is configured as a Spark Ignition (SI) engine. Within the engine 100, a cylinder 129 houses a piston 127 that is actuated by combustion reactions. A combustion chamber 112 is located within the cylinder 129 and is configured to form a containment boundary for the combustion reaction occurring within the engine 100. An intake line 115 is fluidly connected with the combustion chamber 112 housed within the cylinder 129 to provide an air-fuel mixture to the combustion chamber 112 and contains an intake valve 121 to control flow into the combustion chamber 112. A flow guide plate 109 is located within the intake line 115 to direct the air-fuel mixture to a specified location within the combustion chamber 112 and divide the intake line 115.

Figure 1B:
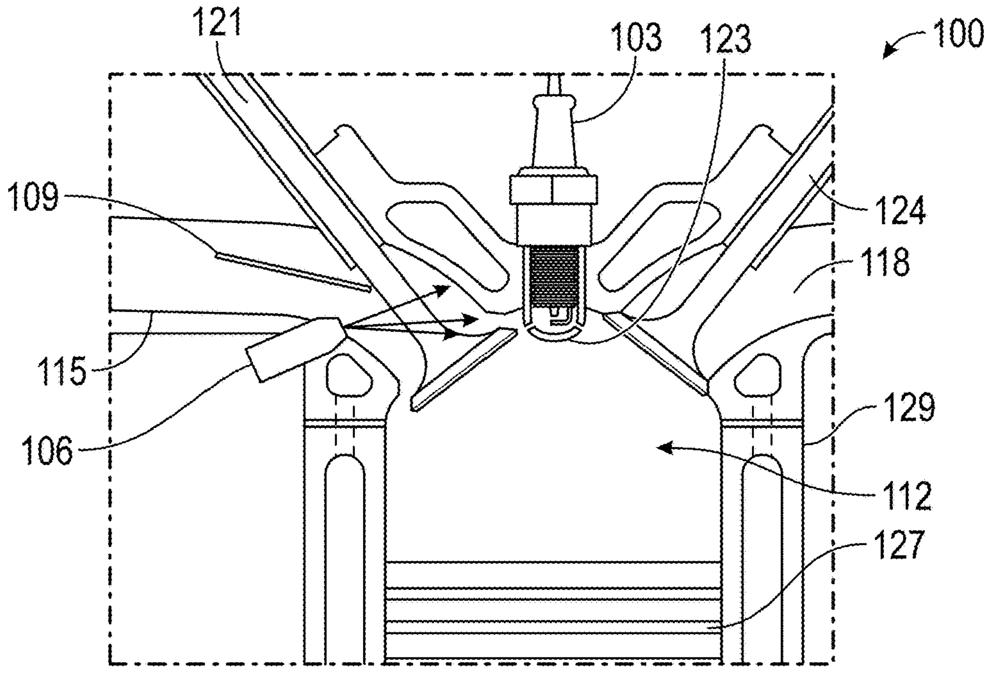
FIG. 1B depicts an internal combustion engine in accordance with one or more embodiments of the present disclosure.

A port fuel injector 106 is mounted to the intake line 115 and is configured to inject fuel into the intake line 115 to form the air-fuel mixture provided to the combustion chamber 112. The specified location to direct the air-fuel mixture to may be based on both the location of the flow guide plate 109 and the location of a port fuel injector 106 within the intake line 115. For example, if the port fuel injector 106 is positioned above the flow guide plate 109, as is shown in FIG. 1A, the air-fuel mixture will be directed along the upper portion of the intake line 115 and will be directed to the upper portion of the combustion chamber 112. Simultaneously, an air stream will be directed along the lower portion of the intake line 115. This embodiment may be beneficial to direct the air-fuel mixture directly towards a prechamber 123. Once the air-fuel mixture is within the combustion chamber 112, a circular rotation (i.e., a tumble flow motion) of the air-fuel mixture occurs as is shown in FIG. 1A. This rotation results in more fuel of the air-fuel mixture concentrated in the periphery of the combustion chamber 112 which thus forces a fuel-rich air-fuel mixture into the prechamber 123. In one or more embodiments, the port fuel injector 106 is mounted in each intake line 115 such that a central axis through the port fuel injector 106 is aligned to intersect each prechamber 123. FIG. 1B illustrates a different placement of the port fuel injector 106 and is discussed in further detail below.

Continuing with FIG. 1A, a spark plug 103 is housed within the prechamber 123 and is configured to ignite the air-fuel mixture provided to the combustion chamber 112 by the intake line 115 to initiate a combustion reaction. In FIG. 1A, the spark plug 103 is positioned on an upper end of the combustion chamber 112 such that the spark plug 103 is disposed above the piston 127. The prechamber 123 concentrates the air-fuel mixture in close proximity to the spark plug 103 for ignition. The exhaust line 118 is in fluid communication with the combustion chamber 112 and provides a path for an exhaust gas, produced by the combustion reaction of the air-fuel mixture, to exit the combustion chamber 112. The exhaust line 118 includes an exhaust valve 124 to control flow of the exhaust gas out of the combustion chamber 112. The intake valve 121 and the exhaust valve 124 may be configured as poppet valves as is commonly known in the art.

FIG. 1B depicts an internal combustion engine 100 in accordance to one or more embodiments of the present disclosure. The major components of FIG. 1B are identical to FIG. 1A, aside from the placement of the port fuel injector 106. As discussed above, the location of the port fuel injector 106 relative to the flow guide plate 109 impacts the ability of the system to direct the air-fuel mixture to a specified location within the combustion chamber 112. If the port fuel injector 106 is positioned below the flow guide plate 109, as is shown in FIG. 1B, the air-fuel mixture will be directed along the lower portion of the intake line 115 and will be directed into the lower portion of the combustion chamber 112.

Though not directly illustrated in FIGS. 1A and 1B, the intake line 115 is a branch of an intake manifold (not shown) and the exhaust line 218 is a branch of an exhaust manifold (not shown). Each cylinder 129 includes a dedicated intake line 115 and a dedicated exhaust line 118 while an overall intake manifold and exhaust manifold is shared between the cylinders of the engine 100. In one or more embodiments, a second intake line 115 and second exhaust line 118 may be present for each cylinder 129 (not shown). This arrangement will be discussed in greater detail with FIGS. 6A and 6B.

Figure 2A:
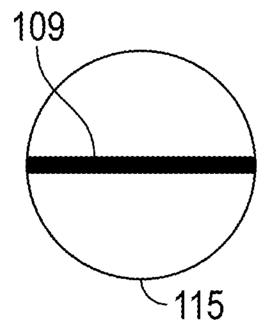
FIG. 2A-2C depict diagrams of various flow guide plate configurations in accordance with one or more embodiments of the present disclosure.
Figure 2B:
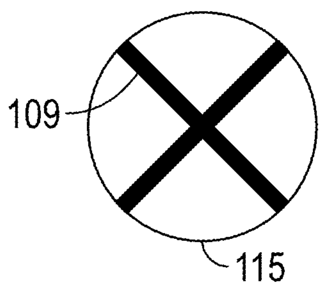
Figure 2C:
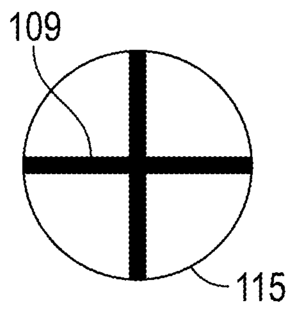
Figure 3A:
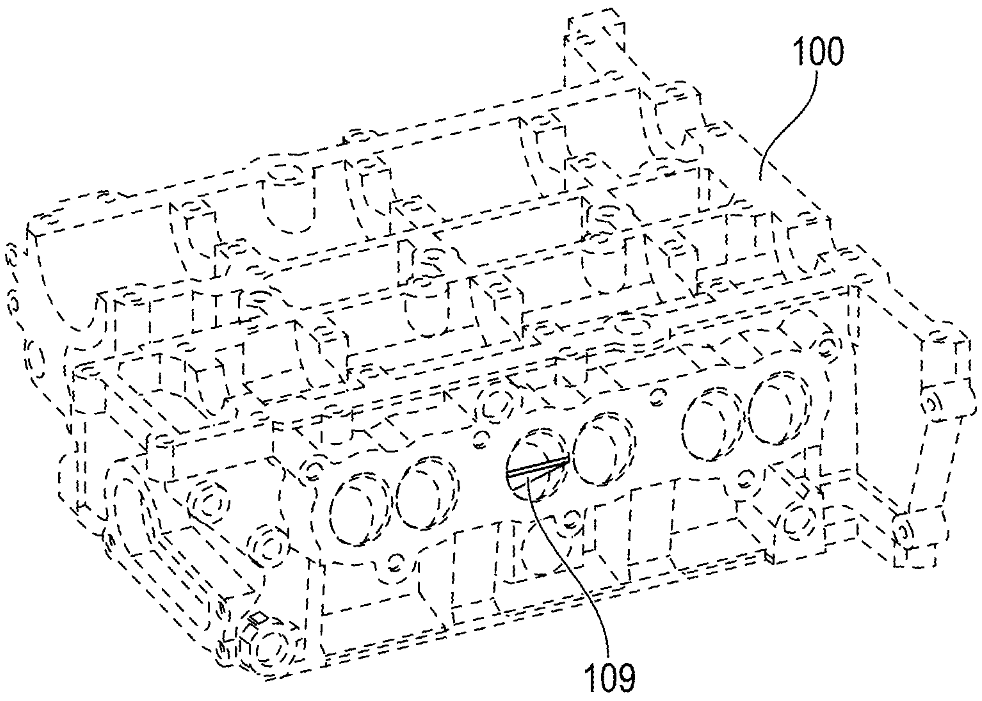
FIG. 3A-3C depict flow guide plates in accordance with one or more embodiments of the present disclosure.
Figure 3B:
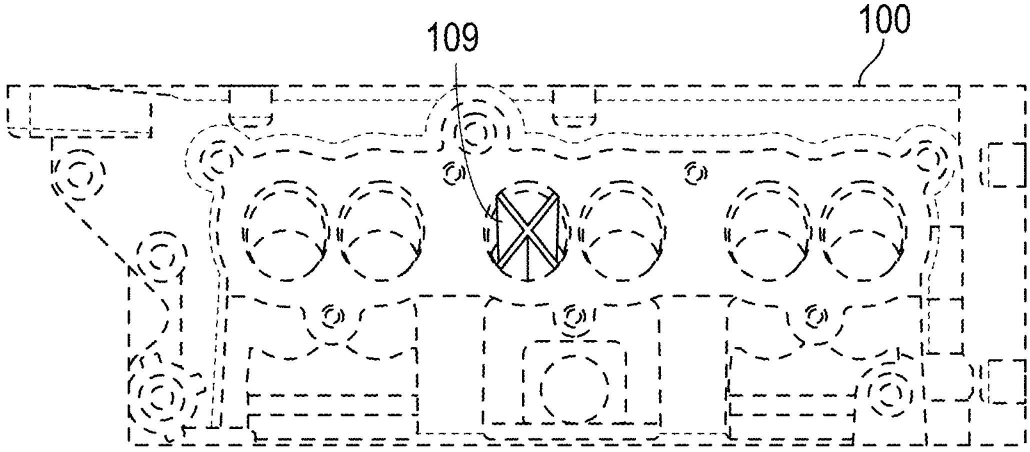
Figure 3C:
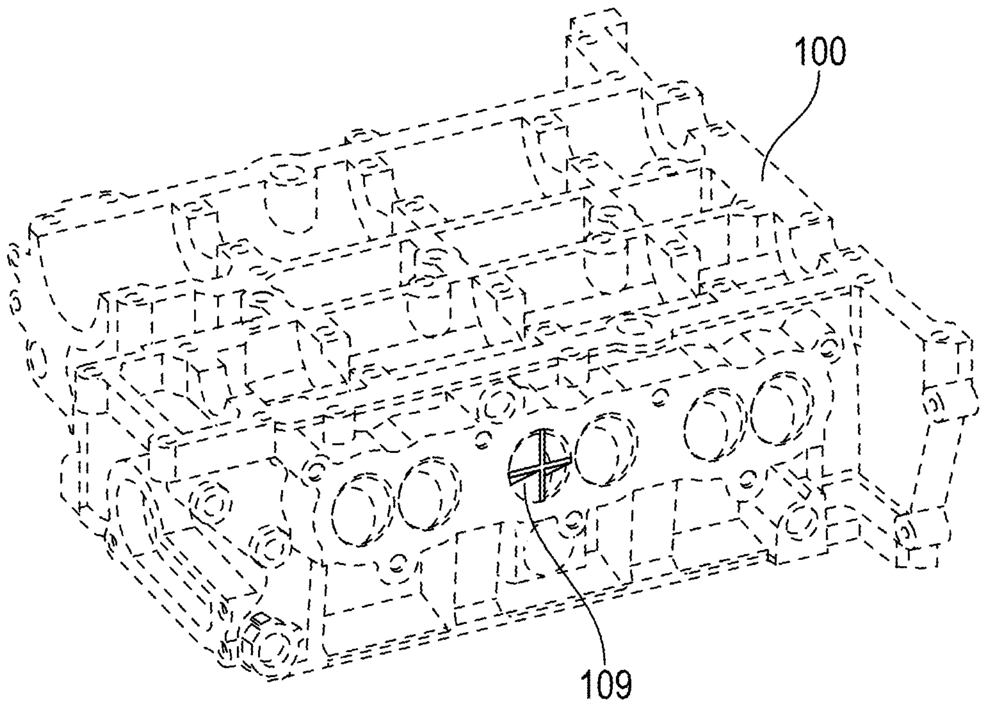

FIG. 2A-2C depict various flow guide plate configurations that are shown in greater detail in FIG. 3A-3C. FIG. 2A shows a flow guide plate 109 oriented to divide the intake line 115 along a single horizontal plane, creating an upper region and a lower region of the intake line 115. The flow guide plate 109 directs fuel to be concentrated in one of the two regions depending on the location of the corresponding port fuel injector 106. The flow guide plate 109 may be a rectangular plate of varying thicknesses fitted within the intake line 115 to fit securely within the intake line 115. In general, the thickness of the flow guide plate 109 is on the order of millimeters (mm) and may range from 1 mm to 10 mm, inclusive. It will be appreciated to a person skilled in the art that the exact thickness of the flow guide plate 109 may vary according to various metrics such the volumetric flow rate of the air-fuel mixture through the intake line 115.

FIG. 2B shows a flow guide plate 109 that includes two intersecting orthogonal members forming four separate sections. The flow guide plate 109 is oriented at 45 degrees relative to a vertical axis (not shown) so as to have an "x" shape. The flow guide plate 109 divides the intake line 115 into four regions, or quadrants, that direct the fuel to be concentrated in any of the quadrants depending on the location of the prechamber 123 relative to the intake line 115.

FIG. 2C shows a flow guide plate 109 that also includes two intersecting plates forming a 90-degree angle between each plate. The flow guide plate 109 is oriented at 0 degrees relative to a vertical axis (not shown) so as to have a "+" shape. The flow guide plate 109 divides the intake line 115 into four quadrants that direct the fuel to be concentrated in any of the quadrants depending on the location of the prechamber 123 relative to the intake line 115. The use of quadrants allows for closer control of the concentration of fuel around the prechamber 123, particularly in the context of a side mounted port fuel injector as described below in relation to FIG. 5, therefore improving ignition properties.

FIG. 3A-3C each depict an engine 100 including one of the various flow guide plate configurations described above in FIG. 2A-2C. FIG. 3A illustrates the flow guide plate 109 shown in FIG. 2A, including a single horizontal plane, dividing the intake line 115 into two portions. FIG. 3B illustrates the flow guide plate 109 shown in FIG. 2B, including two intersecting plates, dividing the intake line 115 into four quadrants. The flow guide plate 109 is oriented at 45 degrees relative to a vertical axis (not shown). FIG. 3C illustrates the flow guide plate 109 shown in FIG. 2C, including two intersecting plates, dividing the intake line 115 into four quadrants. The flow guide plate 109 is oriented at 0 degrees relative to a vertical axis (not shown).

Figure 4:
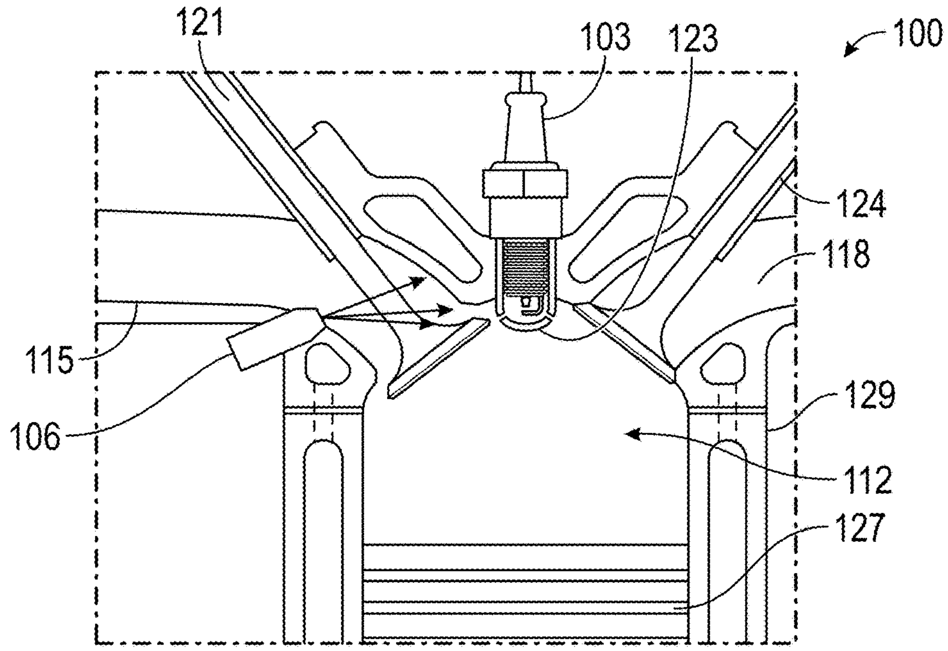
FIG. 4 depicts an internal combustion engine in accordance with one or more embodiments of the present disclosure.

FIG. 4 depicts an internal combustion engine 100 in accordance with one or more embodiments of the present disclosure. With similar components of FIGS. 1A and 1B, FIG. 4 illustrates an internal combustion engine 100 containing a cylinder 129 housing a piston 127, which is configured to be actuated by combustion reactions within the engine 100. A combustion chamber 112 is located within the cylinder 129 and is configured to form a containment boundary for the combustion reaction occurring within the engine 100. An intake line 115 is fluidly connected with the combustion chamber 112 to provide an air-fuel mixture to the combustion chamber 112 and contains an intake valve 121 to control flow of the air-fuel mixture into the combustion chamber 112.

A flow guide plate is absent from the embodiment of FIG. 4. As discussed above, the flow guide plate serves to concentrate a rich fuel mixture adjacent to the prechamber 123. If a flow guide plate were to be included in the embodiment of FIG. 4 above a port fuel injector 106, the flow guide plate would instead direct the rich portion of the air-fuel mixture away from the prechamber 123. Thus, a flow guide plate is absent from the embodiment of FIG. 4 in order to allow the port fuel injector 106 to spray fuel in a linear path towards the prechamber 123. The port fuel injector 106 is mounted to the intake line 115 and is configured to inject fuel into the intake line to form the air-fuel mixture provided to the combustion chamber 112. In FIG. 4, the port fuel injector 106 is positioned on the lower side of the intake line 115. This positioning directs the air-fuel mixture along an axis that intersects the prechamber 123.

A spark plug 103 is housed within the prechamber 123 and is configured to ignite the air-fuel mixture provided to the combustion chamber 112 by the intake line 115 to initiate a combustion reaction. The prechamber 123 concentrates the air-fuel mixture in close proximity to the spark plug 103 for ignition. The exhaust line 118 is in fluid communication with the combustion chamber 112 and provides a path for an exhaust gas, produced by the combustion reaction of the air-fuel mixture, to exit the combustion chamber 112. The exhaust line 118 includes an exhaust valve 124 to control flow of the exhaust gas out of the combustion chamber 112.

FIG. 4 depicts an internal combustion engine 100 in accordance with one or more embodiments of the present disclosure. FIG. 4 includes the same system components as FIGS. 1A and 1B, as described above, though the port fuel injector 106 is mounted differently to provide the fuel to form the air-fuel mixture in a different location in the combustion chamber 112 than in FIG. 4. As shown in FIG. 4, the port fuel injector 106 is positioned on the upper end of the intake line 115.

Figure 5:
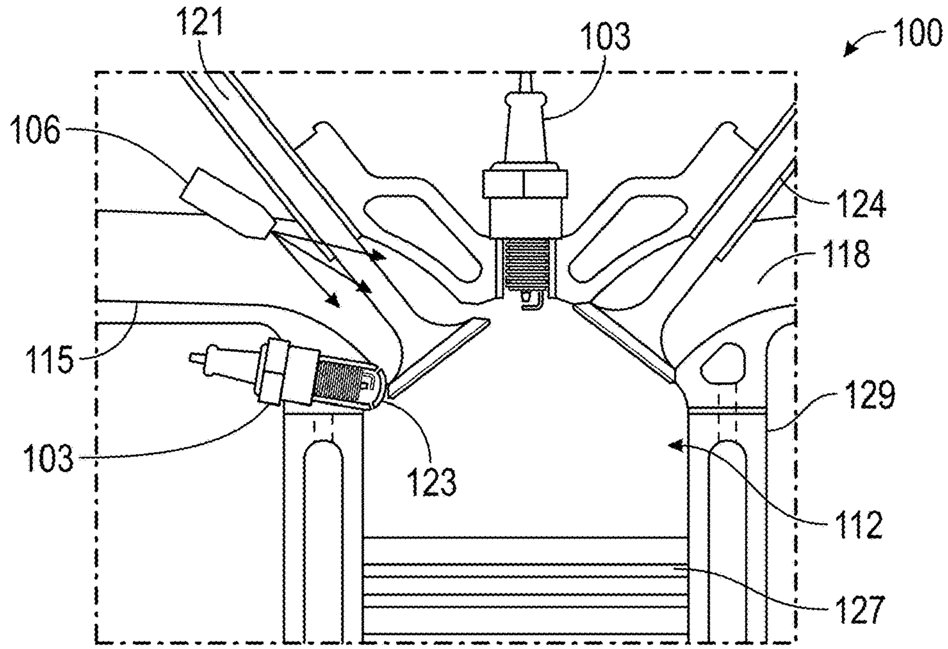
FIG. 5 depicts an internal combustion engine in accordance with one or more embodiments of the present disclosure.

FIG. 5 depicts an internal combustion engine in accordance with one or more embodiments of the present disclosure. With many similar components as FIGS. 1A and 1B, FIG. 5 illustrates an internal combustion engine 100 containing a cylinder 129 housing a piston 127, which is configured to be actuated by combustion reactions within the engine 100. A combustion chamber 112 is located within the cylinder 129 and is configured to form a containment boundary for the combustion reaction occurring within the engine 100. An intake line 115 is fluidly connected with the combustion chamber 112 to provide an air-fuel mixture to the combustion chamber 112 and contains an intake valve 121 to control flow of the air-fuel mixture into the combustion chamber 112. A flow guide plate is absent from this embodiment.

A port fuel injector 106 is mounted to the intake line 115 and is configured to inject fuel into the intake line to form the air-fuel mixture provided to the combustion chamber 112. In FIG. 5, the port fuel injector 106 is positioned on the upper side of the intake line 115. Once the air-fuel mixture is within the combustion chamber 112, a circular rotation occurs of the air-fuel mixture, similar to that described above in FIG. 1A.

In embodiments as illustrated in FIG. 5, there are two spark plugs 103. A first spark plug 103 is positioned at the upper end of the combustion chamber 112. A second spark plug 103 is housed within the prechamber 123 and is mounted on a side of the combustion chamber 112. One of the two spark plugs 103 may or may not be used to ignite and combust the air-fuel mixture within the combustion chamber 112. The above-discussed rotation results in more fuel of the air-fuel mixture concentrated in the periphery of the combustion chamber 112 which thus forces a fuel-rich air-fuel mixture towards the first spark plug 103 and the second spark plug 103 within the prechamber 123. In these embodiments, the air-fuel mixture is concentrated within the prechamber 123 around the second spark plug 103 while also being ignited from the first spark plug 103 without a prechamber 123. In one or more embodiments, the prechamber 123 and the second spark plug 103 are disposed in a cavity. The cavity feature allows for access to the prechamber 123 with minimal protrusion into the combustion chamber 112, while maintaining flow access from the prechamber 123 to the combustion chamber 112, a particularly useful feature in high compression ratio engines.

Although an exhaust manifold is not depicted herein, a person having ordinary skill in the art will appreciate that an exhaust manifold is similar to an intake manifold by virtue of both types of manifolds being configured to facilitate fluid communication with the cylinder. The intake manifold and exhaust manifold are both types of plenums, where the intake manifold is single inlet multiple outlet (SIMO) and the exhaust manifold is multiple inlet single outlet (MISO).

Figure 6A:
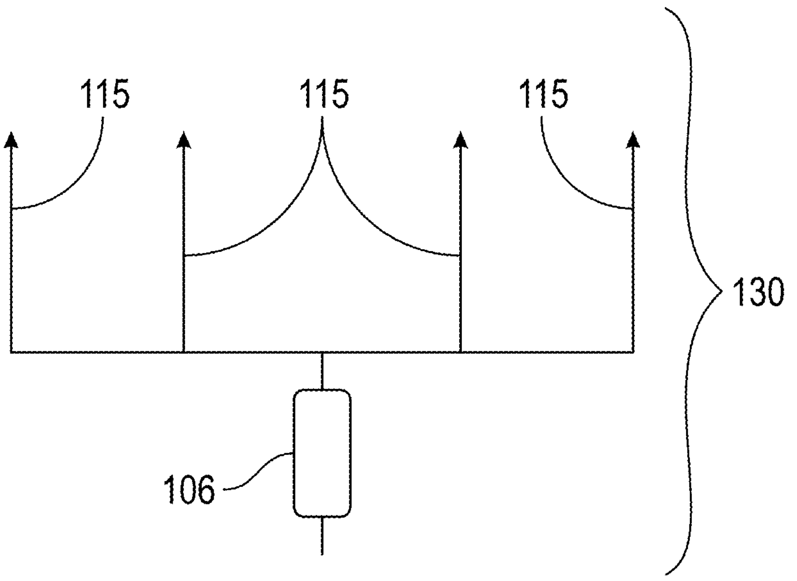
FIG. 6A depicts an intake manifold in accordance with one or more embodiments of the present disclosure.
Figure 6B:
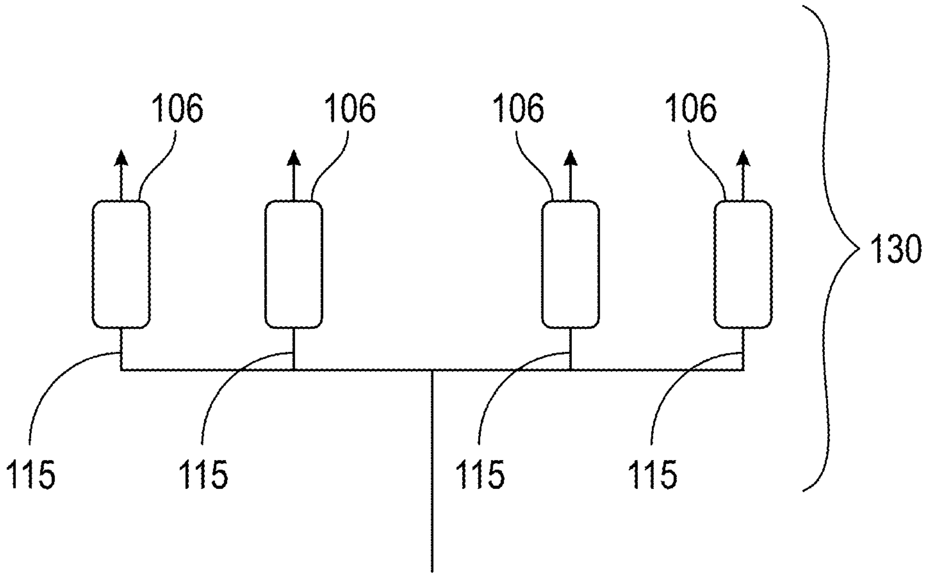
FIG. 6B depicts an intake manifold in accordance with one or more embodiments of the present disclosure.

FIG. 6A-6B depict an intake manifold in accordance with one or more embodiments of the present disclosure. As discussed above, each cylinder 129 includes an intake line 115 branching off from an intake manifold 130 shared between all of the cylinders of the engine 100. In one or more embodiments, as shown in FIG. 6A, a single port fuel injector 106 may be situated in the intake manifold 130 upstream of the branching into intake lines 115. In these embodiments, the port fuel injector 106 injects and distributes fuel to each of the intake lines 115. In these embodiments, thorough mixing occurs for the air-fuel mixture prior to reaching the combustion chamber. In other embodiments, as shown in FIG. 6B, the port fuel injector 106 may be situated in each intake line 115 for each cylinder 129. The arrangement of FIG. 6B may be referred to as a multiple port fuel injector embodiment. As described above, the port fuel injector 106 may be positioned in different orientations relative to the intake line 115. In general, embodiments similar to FIG. 6B may contain the flow guide plate 109 as discussed above, while embodiments similar to FIG. 6A will not benefit fully from the flow guide plate 109. In multiple port fuel injector embodiments, precise fuel delivery is achieved at the cost of electrical efficiency. In other embodiments, a combination of above-described port fuel injector configurations may be used, injecting a portion of the fuel through an upstream port fuel injector 106 and a portion of the fuel through a port fuel injector 106 in the intake line 115.

Figure 7:
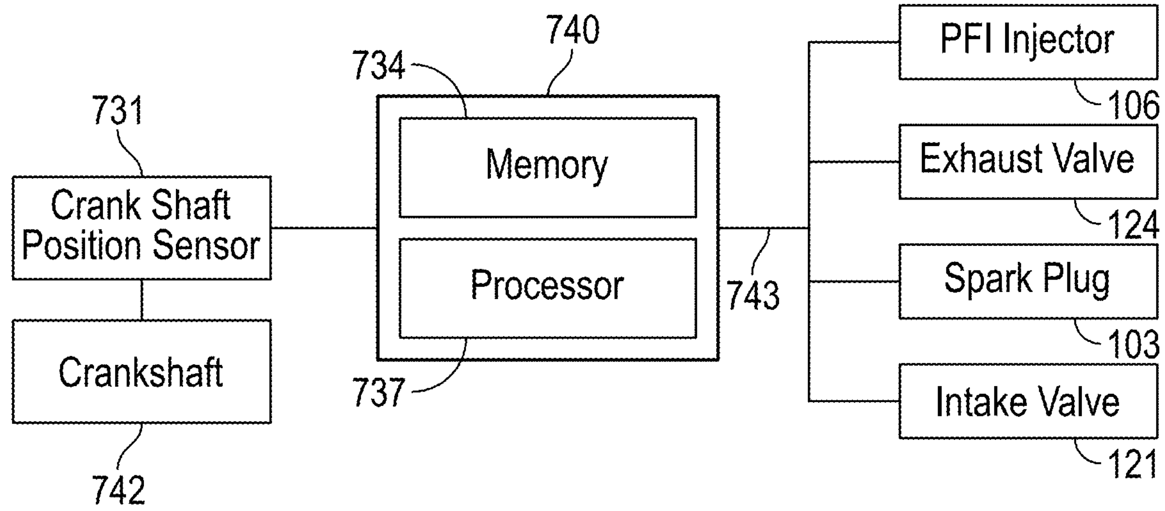
FIG. 7 depicts a block diagram of an engine in accordance with one or more embodiments of the present disclosure.

FIG. 7 depicts a block diagram of an engine in accordance with one or more embodiments of the present disclosure. The electronic control unit (ECU) 740 operates to control operations of the port fuel injector 106, exhaust valve 124, spark plug 103, and intake valve 121 based on a crankshaft position sensor 731. The ECU 740 receives a crankshaft position from the crankshaft position sensor 731. The ECU 740 may control each intake valve 121 in each intake line 115. The ECU 740 may control the fuel injection through the port fuel injector 106. The ECU 740 may control the ignition of the spark plug(s) 103. The ECU 740 may control each exhaust valve 124 in each exhaust line 118.

FIG. 7 depicts hardware components that feed information or receive instructions from the ECU 740 in order to enable operational control. In this regard, the component depicted in FIG. 7 as being connected to the lefthand side of the ECU 740 represents a sensor that feeds information to the ECU 740. Components connected to the right-hand side of the ECU 740 represent components that are controlled by the ECU 740 to physically facilitate control of combustion timing. The various components of FIG. 7 are interconnected by way of a wiring harness (not shown), which is a bundle of wires that form electrical pathways between the ECU 740 and the various sensors and components discussed.

For its part, the ECU 740 includes a memory 734 and a processor 737. The processor 737 is formed by one or more processors, integrated circuits, microprocessors, or equivalent computing structures that serve to execute computer readable instructions stored on the memory 734. Thus, the memory 734 includes a non-transitory storage medium such as flash memory, a Hard Disk Drive (HDD), a solid-state drive (SSD), a combination thereof, or equivalent storage devices. In relation to the invention as described herein, the memory 734 stores computer readable instructions, executed by the processor 737, that relate to controlling operations of the port fuel injector 106, exhaust valve 124, spark plug 103, and intake valve 121 based on the crankshaft position sensor 731 and the crankshaft 742. The crankshaft 742 is a rotating power output shaft for the engine 100 and is mechanically attached to each piston 127. The downward thrusting motion of each piston 127 actuates the crankshaft 742.

As shown in FIG. 7, the primary sensor used to control the components of the system is the crankshaft position sensor 731. The crankshaft position sensor 731 measures the angle of rotation of the crankshaft 742 of the engine 100. The crankshaft position sensor 731 may be one of four types: a magnetic pick-up coil, a Hall-effect sensor, a Magneto-Resistive Element (MRE) sensor, or an optical sensor.

Figure 8:
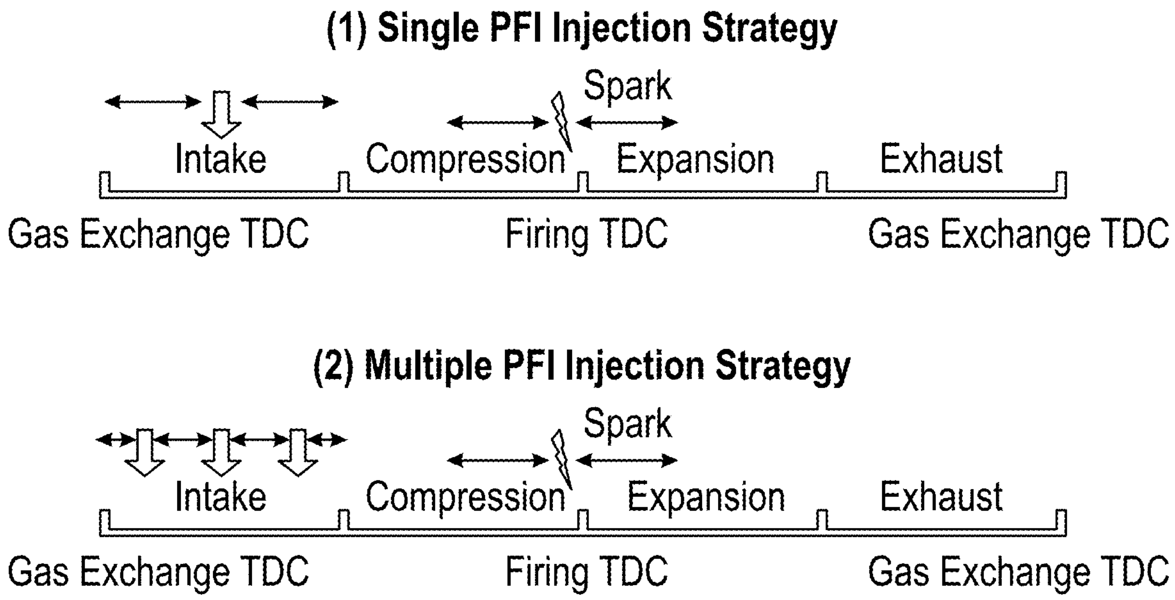
FIG. 8 depicts an injection timing diagram in accordance with one or more embodiments of the present disclosure.

FIG. 8 depicts a diagram of engine timing in accordance with one or more embodiments of the present disclosure. As discussed in FIGS. 6A and 6B above, the engine may operate with one port fuel injector 106 or with multiple port fuel injectors 106. In an engine cycle, the piston 127 moves, using a crankshaft (not shown) forming a rotating power output shaft for the engine 100, between a top dead center position and a bottom dead center position in a cycle containing an intake stroke, a compression stroke, an expansion stroke (sometimes referred to as a combustion stroke), and an exhaust stroke.

The engine timing diagrams shown in FIG. 8 illustrate the timing of the engine cycles associated with using one port fuel injector 106 and multiple port fuel injectors 106. In the single port fuel injector 106 strategy shown, one port fuel injector 106 injects fuel during the intake stroke when the intake valve 121 is opened. The spark plug 103 ignites during the late compression stage or early expansion phase depending on the engine operating conditions.

In the multiple port fuel injector 106 strategy shown, multiple port fuel injectors 106 inject fuel during the intake stroke when the intake valve 121 is opened. The various port fuel injectors 106 deliver fuel in a predetermined and repeatable sequence to reduce fuel penetration length from the port fuel injector. For example, in embodiments with multiple port fuel injectors 106, each of the multiple port fuel injectors 106 may be cycled on and off during the intake stroke. The cycles of the port fuel injectors 106 may be aligned to each other or may be staggered, such that each injector may inject fuel simultaneously or may inject fuel at different times than the other port fuel injectors 106. These cycles may repeat. In the multiple port fuel injector 106 strategy, the spark plug 103 also ignites during the late compression stage or early expansion phase depending on the engine operating conditions.

Figure 9:
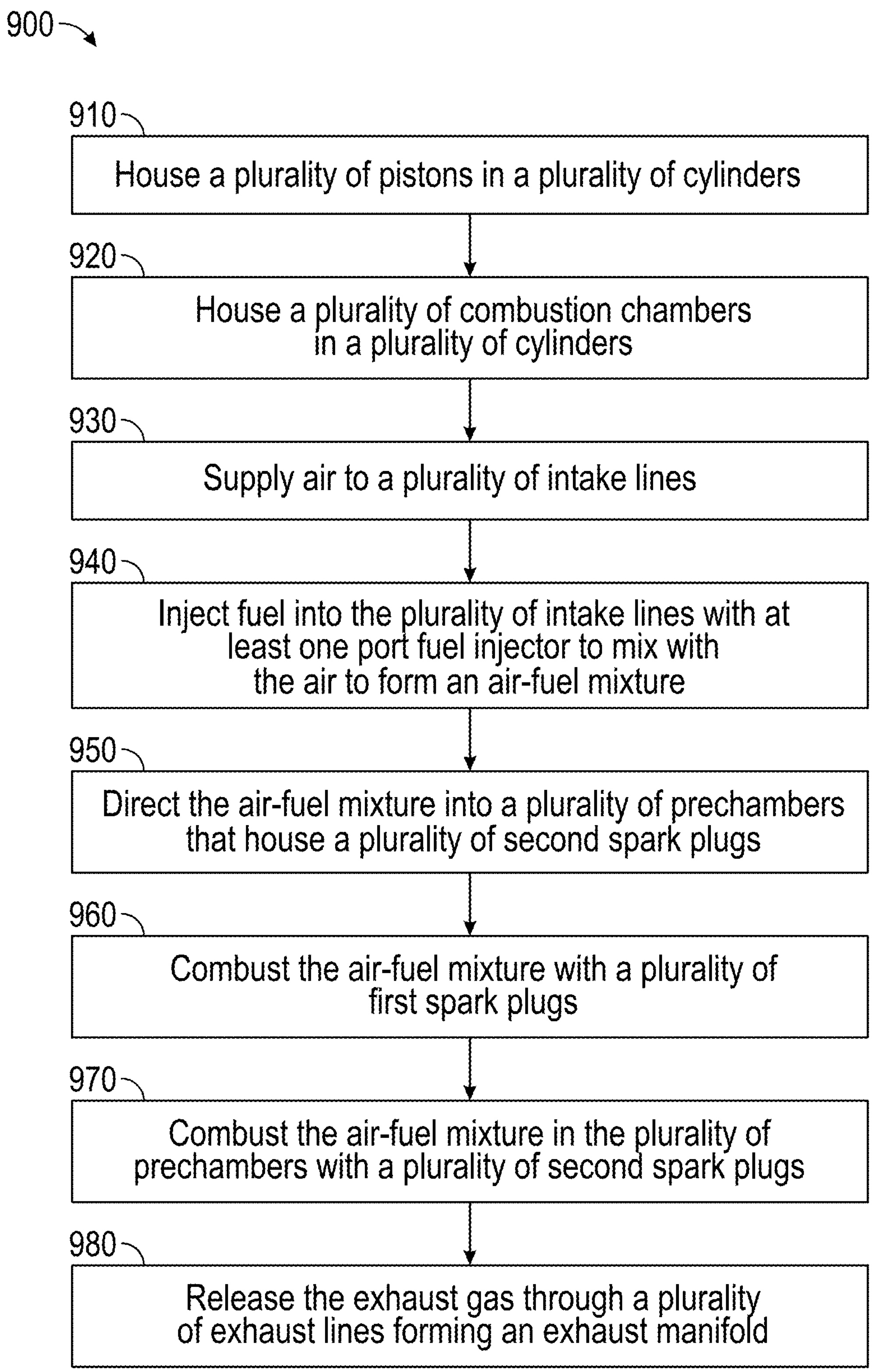
FIG. 9 depicts a flowchart of a method in accordance with one or more embodiments of the present disclosure.

FIG. 9 is a process flow diagram of the method 900. In step 910, for a plurality of pistons, each piston 127 is housed within a cylinder 129 of the plurality of cylinders. In step 920, for a plurality of combustion chambers, each combustion chamber 112 is housed within a cylinder 129 of the plurality of cylinders. Each combustion chamber 112 forms a containment boundary for a corresponding combustion reaction. The combustion chamber 112 is formed by the side walls (not shown) of the cylinder 129, the valve cover (not shown) of the cylinder, and the piston head (not shown) of the piston.

In step 930, air is supplied to each intake line 115 of the plurality of intake lines collectively forming an intake manifold 130. Each of the intake lines 115 is fluidly connected to a corresponding combustion chamber 112 of the plurality of combustion chambers, allowing air to flow from the intake line 115 into the combustion chamber 112.

In step 940, fuel is injected into each intake line 115 of the plurality of intake lines with at least one port fuel injector 106 to mix with the air supplied to the intake lines 115 to form an air-fuel mixture. As discussed above, the port fuel injector 106 may be positioned to inject fuel into an upper or lower half of the intake line 115. The intake line 115 may or may not include a flow guide plate 109 which impacts the distribution of the air-fuel mixture in the combustion chamber 112.

In step 950, the air-fuel mixture is directed into a prechamber 123 of the plurality of prechambers that house a second spark plug 103 of the plurality of second spark plugs. This occurs as a result of both the orientation of the port fuel injector 106, the location of the flow guide plate 109, and the rotation of the air-fuel mixture in the combustion chamber 112, which concentrates the fuel-rich air-fuel mixture towards the periphery of the combustion chamber 112, where the prechamber 123 is situated.

In step 960, the air-fuel mixture is combusted with a first spark plug 103 of the plurality of first spark plugs housed within the corresponding combustion chamber 112. In step 970, the air-fuel mixture is combusted in the prechamber 123 of the plurality of prechambers using a second spark plug 103 of the plurality of second spark plugs. The second spark plug 103 is housed within the corresponding combustion chamber. The combustion using both the first spark plug 103 and the second spark plug 103 produces an exhaust gas.

In step 980, the exhaust gas is released through an exhaust line 118 of the plurality of exhaust lines forming an exhaust manifold. The exhaust line 118 and the exhaust manifold are in fluid communication with the corresponding combustion chamber 112 of the plurality of combustion chambers.

Embodiments of the present disclosure may provide at least one of the following advantages. The arrangements provide improved fuel efficiency over standard passive prechamber designs without significant costs, resulting in a commercially viable, highly-fuel efficient design.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. An engine, comprising:
- a plurality of pistons configured to be actuated by combustion reactions within the engine;
- a plurality of cylinders, each cylinder being configured to house a corresponding piston of the plurality of pistons;
- a plurality of combustion chambers, each combustion chamber being configured to form a containment boundary for a corresponding combustion reaction of the combustion reactions;
- a plurality of intake lines collectively forming an intake manifold, each intake line being fluidly connected with a corresponding combustion chamber of the plurality of combustion chambers to provide an air-fuel mixture to the corresponding combustion chamber;
- at least one port fuel injector configured to inject fuel into the plurality of intake lines to form the air-fuel mixture;
- a flow guide plate configured to direct the air-fuel mixture to a specified location within the corresponding combustion chamber;
- a plurality of spark plugs, each spark plug being configured to ignite the air-fuel mixture in the corresponding combustion chamber to initiate the combustion reactions;
- a plurality of prechambers, each prechamber being configured to house a corresponding spark plug of the plurality of spark plugs to concentrate the air-fuel mixture in close proximity to the corresponding spark plug for ignition; and
- a plurality of exhaust lines forming an exhaust manifold, each exhaust line being configured to be in fluid communication with the corresponding combustion chamber of the plurality of combustion chambers to provide a path for an exhaust gas formed by combustion of the air-fuel mixture to exit the corresponding combustion chamber.

2. The engine of claim 1, wherein the flow guide plate is positioned to divide each intake line of the plurality of intake lines into two regions.

3. The engine of claim 2, wherein the at least one port fuel injector is positioned above the flow guide plate such that the at least one port fuel injector is positioned to inject fuel into an upper side of each intake line.

4. The engine of claim 2, wherein the at least one port fuel injector is positioned below the flow guide plate such that the at least one port fuel injector is positioned to inject fuel into a lower side of each intake line.

5. The engine of claim 1, wherein the flow guide plate is positioned to divide each intake line of the plurality of intake lines into four regions.

6. The engine of claim 1, further comprising:
a crankshaft configured to form a rotating power output shaft of the engine;
a crankshaft position sensor configured to measure a rotation angle of the crankshaft;
a plurality of intake valves configured to control flow of the air-fuel mixture to the corresponding combustion chamber;
a plurality of exhaust valves configured to control flow of the exhaust gas exiting the combustion chambers;
an Electronic Control Unit (ECU) configured to:
receive a crankshaft position from the crankshaft position sensor;
control the plurality of intake valves positioned in the plurality of intake lines;
control injection of the fuel through the at least one port fuel injector;
control ignition of the plurality of spark plugs; and
control the plurality of exhaust valves positioned in the plurality of exhaust lines.

7. The engine of claim 1, wherein each of the plurality of spark plugs is mounted on an upper end of the corresponding combustion chamber such that spark plug is positioned above the corresponding piston.

8. The engine of claim 1, wherein the at least one port fuel injector comprises a plurality of port fuel injectors and each port fuel injector of the plurality of port fuel injectors is mounted in each intake line of the plurality of intake lines such that a central axis through the at least one port fuel injector is aligned to intersect each prechamber of the plurality of prechambers.

9. The engine of claim 1, wherein the at least one port fuel injector comprises one port fuel injector located upstream of the plurality of intake lines to inject the fuel into each of the plurality of intake lines.

10. An engine, comprising:
a plurality of pistons configured to be actuated by combustion reactions within the engine;
a plurality of cylinders, each cylinder being configured to house a corresponding piston of the plurality of pistons;
a plurality of combustion chambers, each combustion chamber being configured to form a containment boundary for a corresponding combustion reaction of the combustion reactions;
a plurality of intake lines collectively forming an intake manifold, each intake line being fluidly connected with a corresponding combustion chamber of the plurality of combustion chambers to provide an air-fuel mixture to the corresponding combustion chamber;
at least one port fuel injector configured to inject fuel into the plurality of intake lines to form the air-fuel mixture;
a plurality of first spark plugs, each first spark plug being housed within the corresponding combustion chamber and configured to ignite the air-fuel mixture in the corresponding combustion chamber to initiate the combustion reactions;
a plurality of second spark plugs, each second spark plug being housed within the corresponding combustion chamber and configured to ignite the air-fuel mixture in the corresponding combustion chamber to initiate the combustion reactions;
a plurality of prechambers, each prechamber being configured to house a corresponding second spark plug of the plurality of spark plugs to concentrate the air-fuel mixture in close proximity to the spark plug for ignition; and
a plurality of exhaust lines forming an exhaust manifold, each exhaust line being configured to be in fluid communication with the corresponding combustion chamber of the plurality of combustion chambers to provide a path for an exhaust gas formed by combustion of the air-fuel mixture to exit the corresponding combustion chamber.

11. The engine of claim 10, wherein each first spark plug is positioned above the piston such that each of the plurality of first spark plugs is mounted on an upper end of the corresponding combustion chamber.

12. The engine of claim 10, wherein each of the plurality of second spark plugs housed within each prechamber is mounted on a side of the corresponding combustion chamber.

13. The engine of claim 10, wherein the at least one port fuel injector comprises a plurality of port fuel injectors and each port fuel injector of the plurality of port fuel injectors is positioned to inject the fuel into an upper side of each intake line.

14. The engine of claim 10, further comprising:
a crankshaft configured to form a rotating power output shaft of the engine;
a crankshaft position sensor configured to measure a rotation angle of the crankshaft;
a plurality of intake valves configured to control flow of the air-fuel mixture to the corresponding combustion chamber;
a plurality of exhaust valves configured to control flow of the exhaust gas exiting the plurality of combustion chambers;
an Electronic Control Unit (ECU) configured to:
receive a crankshaft position from the crankshaft position sensor;
control the plurality of intake valves positioned in the plurality of intake lines;
control injection of the fuel through the at least one port fuel injector;
control ignition of the plurality of first spark plugs;
control ignition of the plurality of second spark plugs; and
control the plurality of exhaust valves positioned in the plurality of exhaust lines.

15. The engine of claim 10, wherein the at least one port fuel injector comprises one port fuel injector located upstream of the plurality of intake lines to inject the fuel into each of the plurality of intake lines.

16. A method, comprising:
housing a plurality of pistons in a plurality of cylinders, where each cylinder houses a corresponding piston of the plurality of pistons;
housing a plurality of combustion chambers in the plurality of cylinders, where each combustion chamber forms a containment boundary for a corresponding combustion reaction;
supplying air to a plurality of intake lines collectively forming an intake manifold, each intake line being fluidly connected with a corresponding combustion chamber of the plurality of combustion chambers;
injecting fuel into the plurality of intake lines with at least one port fuel injector, where the fuel mixes with the air to form an air-fuel mixture;
directing the air-fuel mixture into a plurality of prechambers housing a plurality of first spark plugs;
combusting the air-fuel mixture with the plurality of first spark plugs housed within the corresponding combustion chamber;

combusting the air-fuel mixture in the plurality of prechambers with a plurality of second spark plugs housed within the corresponding combustion chamber, producing an exhaust gas; and releasing the exhaust gas through a plurality of exhaust lines forming an exhaust manifold in fluid communication with the corresponding combustion chamber of the plurality of combustion chambers.

17. The method of claim 16, further comprising: mounting each of the plurality of first spark plugs on an upper end of the corresponding combustion chamber.

18. The method of claim 16, further comprising mounting each of the plurality of second spark plugs housed within each prechamber on a side of the corresponding combustion chamber.

19. The method of claim 16, further comprising: positioning the at least one port fuel injector to inject the fuel into an upper side of each intake line.

20. The method of claim 16, further comprising:

receiving a crankshaft position from a crankshaft position sensor with an Electronic Control Unit (ECU);

controlling the at least one port fuel injector with the ECU to include injecting fuel multiple times throughout an engine cycle; and controlling the plurality of first spark plugs with the ECU.

* * * * *